(12) United States Patent
Smallwood et al.

(10) Patent No.: US 11,530,013 B2
(45) Date of Patent: Dec. 20, 2022

(54) HANDLEBAR

(71) Applicant: Cyclesport North Limited, Preston (GB)

(72) Inventors: Andrew Smallwood, Redditch (GB); Jamie Burrow, Chorley (GB)

(73) Assignee: CYCLESPORT NORTH LIMITED, Preston (GB)

( * ) Notice: Subject to any disclaimer, the term of this patent is extended or adjusted under 35 U.S.C. 154(b) by 0 days.

(21) Appl. No.: 17/449,830

(22) Filed: Oct. 4, 2021

(65) Prior Publication Data

US 2022/0363334 A1 Nov. 17, 2022

(30) Foreign Application Priority Data

May 12, 2021 (EP) .................................... 21173702

(51) Int. Cl.
*B62K 21/12* (2006.01)

(52) U.S. Cl.
CPC .................................... *B62K 21/12* (2013.01)

(58) Field of Classification Search
None
See application file for complete search history.

(56) References Cited

U.S. PATENT DOCUMENTS

| | | | | |
|---|---|---|---|---|
| 4,445,396 A | * | 5/1984 | Shimano | B62K 21/12 74/551.8 |
| 5,909,782 A | * | 6/1999 | Pluff | B60K 13/04 180/309 |
| 6,546,827 B2 | * | 4/2003 | Irie | B62K 21/12 74/551.9 |
| 7,908,940 B2 | | 3/2011 | Naka et al. | |
| 8,056,439 B2 | | 11/2011 | Fukui et al. | |
| 9,120,522 B1 | | 9/2015 | Nishino | |
| 10,227,104 B2 | | 3/2019 | Yang et al. | |
| 2006/0266594 A1 | | 11/2006 | Tsai | |
| 2016/0347415 A1 | | 12/2016 | Katsura et al. | |
| 2017/0166280 A1 | | 6/2017 | Yang et al. | |

FOREIGN PATENT DOCUMENTS

| | | |
|---|---|---|
| DE | 3900330 | 7/1990 |
| EP | 0035372 | 9/1981 |
| EP | 1245482 | 10/2002 |
| EP | 2402240 | 1/2012 |
| FR | 2326324 | 4/1977 |

\* cited by examiner

*Primary Examiner* — Vicky A Johnson
(74) *Attorney, Agent, or Firm* — Trego, Hines & Ladenheim, PLLC

(57) ABSTRACT

A handlebar for controlling a travelling direction of a vehicle. The handlebar comprises: an elongate transverse support for mounting to a vehicle, the transverse support extending substantially along a transverse axis between a first end thereof and a second end thereof; wherein the transverse support comprises a first wake promotion portion configured to promote wake formation downstream thereof relative to one or more adjacent non-wake promotion portions of the transverse support when air flows over the handlebar in a flow direction substantially perpendicular to the transverse axis.

35 Claims, 10 Drawing Sheets

HANDLEBAR

FIELD

The present teachings relate to a handlebar for controlling a travelling direction of a vehicle.

BACKGROUND

Many vehicles, such as, push bicycles, motorcycles, tricycles and quadracycles include a handlebar that is used to control the travelling direction of the vehicle. A handlebar provides a hand position for a user that allows the user to pivot the handlebar to change the travelling direction of the vehicle.

It is common for a handlebar to be mounted to a vehicle such that the handlebar is exposed to oncoming air flowing over the vehicle, for example, when the vehicle is a bicycle. For such vehicles, it is also common for the operator of the vehicle to be exposed to the oncoming air flow. As the vehicle and the operator move, the air flowing over them results in drag forces acting on both the vehicle and the operator. The magnitude of the drag forces are dependent on the speed of the oncoming air flow which may be predominantly dependent on the speed of the vehicle.

A total drag force can be calculated as the resultant of the drag forces acting on: i) the handlebar; ii) the remainder of the vehicle; and iii) the operator of the vehicle. The drag forces acting on each of i)-iii) will have components of form drag and skin-friction drag. It will be appreciated that the form drag acting on an object arises due to separation of a boundary layer from a surface of that object, and is highly dependent on the object's shape. Moreover, it will be appreciated that skin-friction drag arises from the friction of the air against a surface of an object. For any given vehicle speed, the lower the total drag force, the less energy is needed to move the vehicle. Hence, it is beneficial to minimize the total drag force.

It is well known for handlebars to have a circular profile along their length. Since such geometries equate to a bluff body, a problem with such handlebars is that they tend to suffer from significant profile drag due to boundary layer separation.

It also known for handlebars to be "aerodynamically" shaped in order to reduce form drag relative to circular profile handlebars. However, the reduction in the total drag force achieved by such handlebars in many cases is insignificant. The present invention aims to overcome or mitigate the problems associated with existing handlebars.

SUMMARY

According to a first aspect, there is provided a handlebar for controlling a travelling direction of a vehicle. The handlebar comprises: an elongate transverse support for mounting to a vehicle, the transverse support extending substantially along a transverse axis between a first end thereof and a second end thereof; wherein the transverse support comprises a first wake promotion portion configured to promote wake formation downstream thereof relative to one or more adjacent non-wake promotion portions of the transverse support when air flows over the handlebar in a flow direction substantially perpendicular to the transverse axis.

Advantageously, by promoting wake formation downstream of the wake promotion portion of the handlebar in use, it has been determined that the combined total drag, that is the total drag acting on the handlebar, the vehicle to which the handlebar is mounted and the operator of the vehicle, is less relative to a handlebar where no portions of the handlebar promote wake formation, especially when the vehicle is a bicycle.

Providing both a wake promotion portion and non-wake promotion portions helps to ensure that wakes are generated in only the parts of the handlebar that result in significant combined total drag reductions.

The first wake promotion portion may be interposed between a transverse mid-point of the transverse support and the first end.

This may allow the first wake promotion portion to help form a wake upstream of a first leg of a vehicle operator. It has been determined that forming a wake upstream of a vehicle operator's leg helps to significantly reduce the combined total drag, especially when the vehicle is a bicycle.

One of the one or more non-wake promotion portions may be interposed between the first wake promotion portion and the first end.

The handlebar may further comprise a second wake promotion portion configured to promote wake formation downstream thereof relative to one or more adjacent non-wake promotion portions of the transverse support when air flows over the handlebar in the flow direction.

Advantageously, providing the handlebar with two wake promotion portions may further reduce the combined total drag.

The second wake promotion portion may be interposed between the transverse mid-point of the transverse support and the second end of the transverse support.

This may allow the second wake promotion portion to help form a wake upstream of a second leg of a vehicle operator. It has been determined that forming a wake upstream of a vehicle operator's leg helps to significantly reduce the combined total drag, especially when the vehicle is a bicycle.

One of the one or more non-wake promotion portions may be interposed between the second wake promotion portion and the second end.

One of the one or more non-wake promotion portions may be interposed between the first wake promotion portion and the second wake promotion portion.

This may help to reduce the magnitude of wakes downstream of the transverse mid-point of the transverse portion. Advantageously, this may help to reduce the combined total drag as well as increasing the comfort of a vehicle user.

The first wake promotion portion may extend transversely from a first portion end to a second portion end. The first portion end may be located between the first end and a transverse mid-point of the transverse support. The second portion end may be located between the second end and the transverse mid-point of the transverse support.

One of the one or more non-wake promotion portions may be located at a transverse mid-point of the transverse support.

Each wake promotion portion may be at least partially defined by a first surface and an opposed second surface. The first and second surfaces may extend along a transverse length of the wake promotion portion. The first surface may be arranged above the second surface in use. A profile of the first surface in a plane normal to the flow direction may be non-parallel to a corresponding profile of the second surface.

Each wake promotion portion may be at least partially defined by a first surface and an opposed second surface. The first and second surfaces may extend along a transverse length of the wake promotion portion. The first surface may be arranged above the second surface in use. The first surface or the second surface may have a hump-shaped profile in a plane normal to the flow direction.

The other of the first surface or the second surface may have a relatively less curved, e.g. substantially straight, profile in a plane normal to the flow direction.

Providing the lower second surface with a hump-shaped profile may help to ensure wakes are formed upstream of a leg of a vehicle operator. It has been determined that forming a wake upstream of a vehicle operator's leg helps to significantly reduce the combined total drag, especially when the vehicle is a bicycle.

At least one of the one or more non-wake promotion portions may be at least partially defined by a first surface and an opposed second surface. The first and second surfaces may extend along a transverse length of the non-wake promotion portion. The first surface may be arranged above the second surface in use. A profile of the first surface in a plane normal to the flow direction may be substantially parallel to a corresponding profile of the second surface.

This may help to reduce the magnitude of any wakes generated downstream of the non-wake promotion portions.

Each wake promotion portion may have a maximum thickness substantially normal to the flow direction greater than a corresponding maximum thickness of the one or more non-wake promotion portions.

This may help to promote wake formation in the wake promotion portion by contributing to an adverse pressure gradient in air flowing thereover. The adverse pressure gradient will promote boundary layer separation. Separation of the boundary layer may result in downstream wake formation.

Each wake promotion portion may have a non-circular profile in a plane normal to the transverse axis.

Each wake promotion portion may have a substantially aerofoil-shaped profile.

Each wake promotion portion may have a substantially aerofoil-shaped profile with a truncated trailing edge defining a first downstream wall. Said first downstream wall may be joined to the remainder of the profile via a first corner and a second corner.

Each first downstream wall may be substantially planar.

The first corner may be angular and/or the second corner may be angular.

Advantageously, the angular first corner and the angular second corner help to promote boundary layer separation, which may result in downstream wake formation.

At least one of the one or more non-wake promotion portions may have a substantially aerofoil-shaped profile with a truncated trailing edge defining a second downstream wall.

Advantageously, providing the one or more non-wake promotion portions with a truncated aerofoil-shaped profile may improve the comfort of a person gripping that portion of the handlebar.

Each second downstream wall may be substantially planar.

Each first downstream wall may have a maximum width perpendicular to the flow direction greater than a corresponding maximum width of each second downstream wall.

This may help to promote boundary layer separation for air flowing over each wake promotion portion relative to the non-wake promotion portions.

Each wake promotion portion may have a substantially aerofoil-shaped profile and at least one of the one or more non-wake promotion portions may have a substantially aerofoil-shaped profile. Said substantially aerofoil-shaped profile of each wake promotion portion may have a greater angle of attack with respect to the flow direction relative to the substantially aerofoil-shaped profile of said at least one of the one or more non-wake promotion portions.

Providing each wake promotion portion with a greater angle of attack relative to the at least one non-wake promotion portion, may result in boundary layer separation on each wake promotion portion at a lower flow Reynolds number relative to the at least one non wake promotion portion.

The profile of the transverse support may vary smoothly along the transverse axis.

This may help to reduce drag on the handlebar resulting from air flowing over the handlebar parallel to the transverse axis.

A variable thickness of each wake promotion portion substantially normal to the flow direction may taper towards the first end and/or the second end of the transverse support.

Advantageously, this may help to control the direction of wakes formed via the wake promotion portion as they travel downstream.

The handlebar may further comprise a mounting arrangement for mounting the handlebar to a vehicle.

The mounting arrangement may be located substantially at a transverse mid-point of the transverse support.

The handlebar may further comprise a first grippable element extending from the first end of the transverse support and a second grippable element extending from the second end of the transverse support.

The first grippable element may extend from the first end at a non-zero angle thereto. The second grippable element may extend from the second end at a non-zero angle thereto.

The transverse support may be substantially chevron-shaped when viewed in plan view.

According to a second aspect, there is provided a vehicle comprising the handlebar according to the first aspect.

The vehicle may be a bicycle, a tricycle or a quadracycle.

BRIEF DESCRIPTION OF THE DRAWINGS

Embodiments are now disclosed, by way of example only, with reference to the drawings, in which.

DETAILED DESCRIPTION OF EMBODIMENT(S)

A handlebar 100 is used for controlling a travelling direction of a vehicle, such as a push bicycle, a motorcycle, a tricycle, or a quadracycle.

Figure 1:
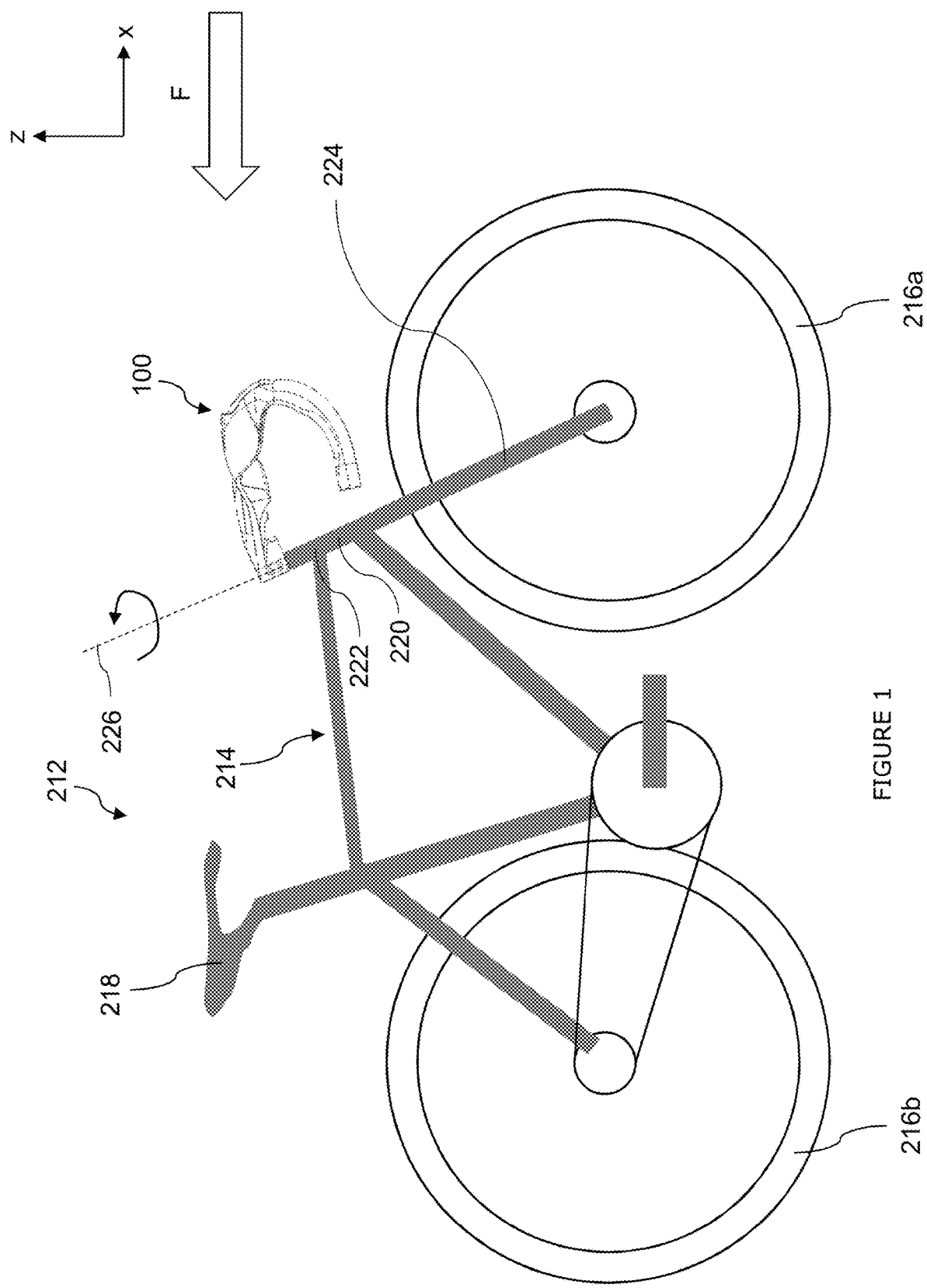
FIG. 1 is a side view of a bicycle comprising a handlebar according to an embodiment.

FIG. 1 shows an example where the vehicle comprising the handlebar 100 is a push bicycle 212. The push bicycle 212 includes the handlebar 100, a frame 214, a front wheel 216a, a rear wheel 216b and a seat 218.

With reference to FIGS. 2 to 6, the handlebar 100 includes a transverse support 102, a first grippable element 104a and a second grippable element 104b. The first grippable element 104a includes a first free end 112a, and the second grippable element 104b includes a second free end 112b.

In the illustrated embodiment, the transverse support 102, the first grippable element 104a and the second grippable element 104b are formed at least partially from carbon fiber. However, in alternative embodiments (not shown), one or more of the transverse support 102, the first grippable element 104a and the second grippable element 104b may be formed from any alternative suitable material, such as alloys of aluminum, titanium or steel for example.

The grippable elements 104a, 104b are each for receiving a gripping hand of a user of the handlebar 100. The transverse support 102 supports the grippable elements 104a, 104b, and provides moment arms for pivoting the handlebar 100 via the grippable elements 104a, 104b. The transverse support 102 may also be suitable for receiving a gripping hand.

The transverse support 102 includes a mounting portion 108, an elongate first transverse portion 110a and an elongate second transverse portion 110b. The first grippable element 104a extends from a first end 109a of the transverse support 102, i.e. from an end of the first transverse portion 110a furthest from the mounting portion 108. Likewise, the second grippable element 104b extends from a second end 109b of the transverse support 102, i.e. from an end of the second transverse portion 110b furthest from the mounting portion 108. As such, the first transverse portion 110a extends between the mounting portion 108 and the first grippable element 104a, and the second transverse portion 110b extends 30 between the mounting portion 108 and the second grippable element 104b.

Figure 2:
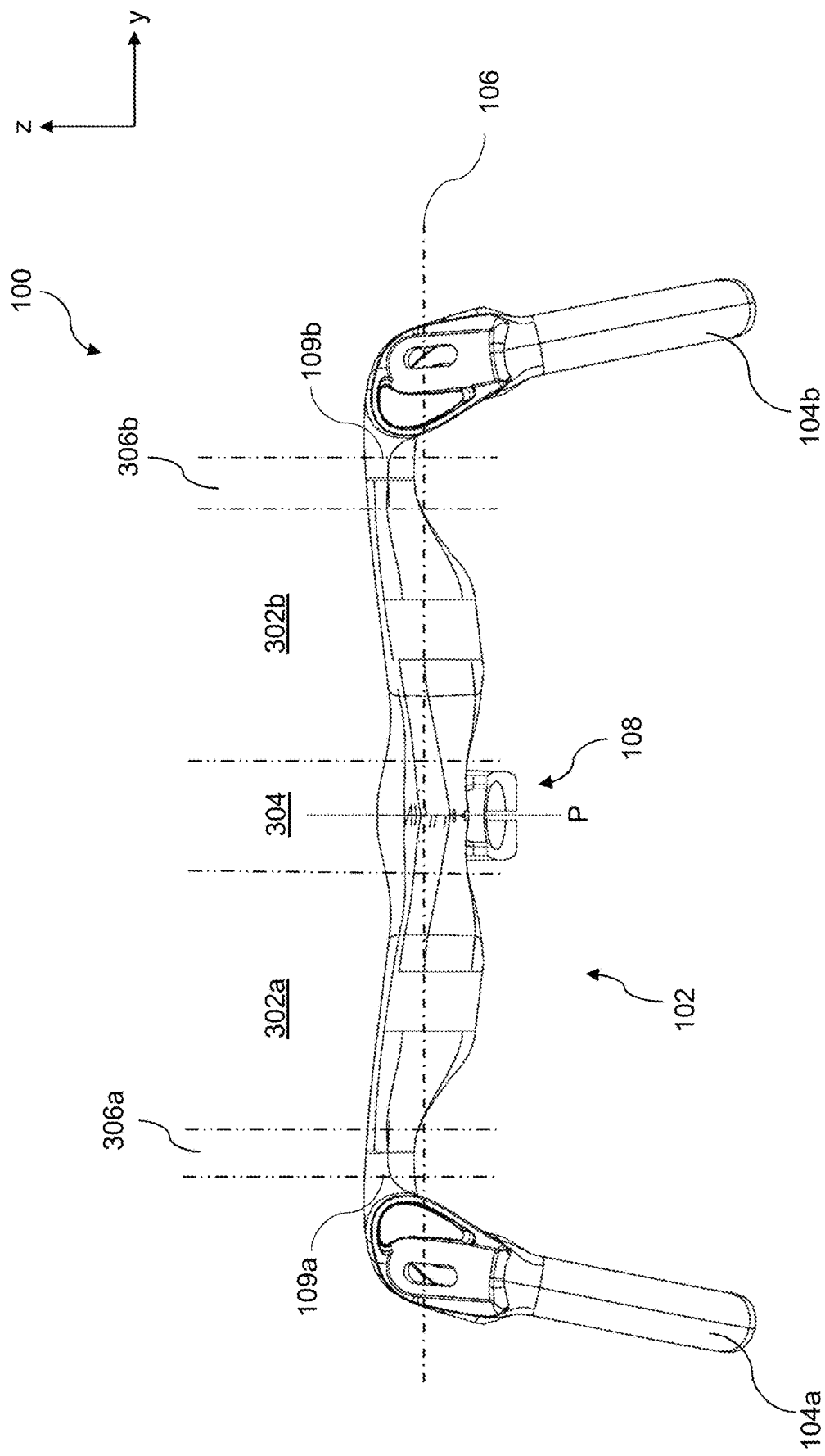
FIG. 2 is a front view of the handlebar according to the embodiment.
Figure 3:
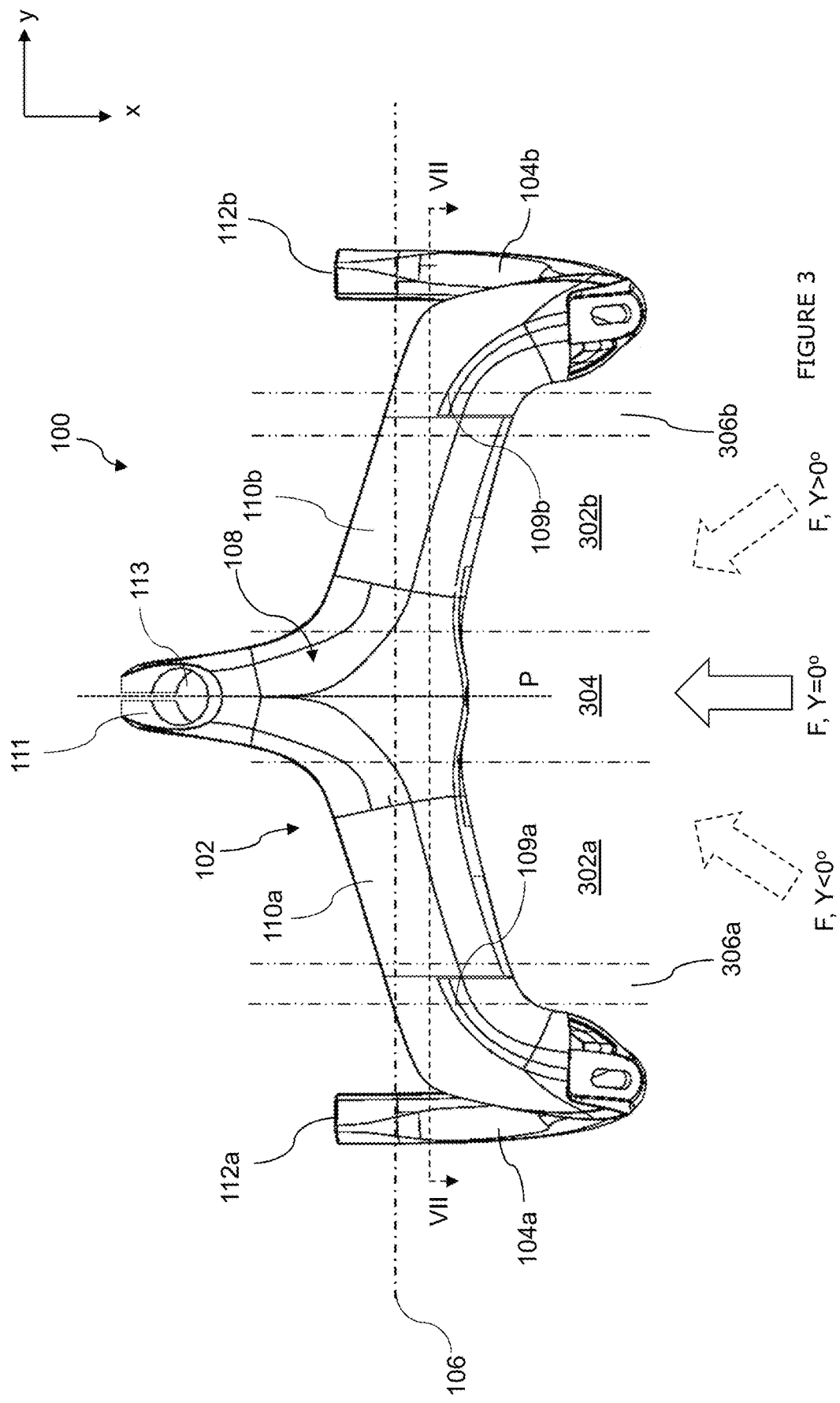
FIG. 3 is a top view of the handlebar shown in FIG. 2.

The transverse support 102 extends substantially along a transverse axis 106 (represented by a dot-dash line in FIGS. 2 to 4, 6 and 7). As used herein, the term "substantially along" does not require a perfectly straight object or perfectly parallel alignment. For example, in the illustrated embodiment, the transverse support 102 does not extend parallel to the transverse axis 106. Instead, the first transverse portion 110a and the second transverse portion 110b extend away from the mounting portion 108 at an acute angle relative to the transverse axis 106. As such, the transverse support 102 has a substantially chevron-shaped profile when viewed as shown in FIG. 3.

Advantageously, providing the transverse support 102 with a chevron-shaped profile increases the stiffness of the transverse support 102. Further, since the first and second transverse portions 110a, 110b extend away from the mounting portion 108 at an acute angle relative to the transverse axis 106, the mounting portion 108 has a smaller length as measured perpendicular to the transverse axis 106 relative to if the transverse support 102 was straight. This is because the first and second transverse portions 110a, 110b space the grippable element 104a, 104b from the steering tube 220 to provide a comfortable riding position, instead of the mounting portion 108.

In alternative embodiments (not shown), the transverse support 102 may extend parallel to the transverse axis 106, i.e. the transverse support 102 may be substantially straight. Alternatively, the transverse support 102 may have any suitable non-straight and non-chevron shape.

The first grippable element 104a extends from the first end 109a of the transverse support 102 at a non-zero angle thereto; i.e. a longitudinal axis of the first grippable element 104a extends from a central axis (not shown) of the first transverse portion 110a at a non-zero angle. Likewise, the second grippable element 104b extends from the second end 109b of the transverse support 102 at a non-zero angle thereto. As such, the handlebar 100 is not a straight handlebar. In the illustrated embodiment, the handlebar 100 is of the drop handlebar type.

In alternative embodiments (not shown), the grippable elements 104a, 104b may extend from the transverse support 102 such that they are substantially parallel to the respective first and second transverse portions 110a, 110b; e.g. the handlebar 100 may be a flat handlebar, as found on mountain bicycles for example. Alternatively, the grippable elements 104a, 104b and the transverse support 102 may be shaped such that the handlebar 100 is any one of: a bullhorn handlebar; a BMX style handlebar; a triathlon style handlebar; an upright/North Road handlebar; a moustache handlebar; an ape hanger handlebar; and a recumbent handlebar.

The mounting portion 108 includes a mounting arrangement for mounting the handlebar 100 to the bicycle 212. The mounting arrangement is located at a transverse mid-point of the transverse support 102; i.e. the mounting arrangement is intersected by a transverse central plane P (represented as a dashed line in FIGS. 2 and 3), which is normal to the transverse axis 106 and parallel to the x-z plane in the Figures.

In the illustrated embodiment, the mounting arrangement includes a clamp 111 defining a circular aperture 113. A portion of a steering tube 220 is received within the aperture 113 of the clamp 111, and is secured in place using fasteners (not shown).

The steering tube 220 passes through a head tube 222, which is part of the frame 214 of the bicycle 212, and a fork 224 extends from the steering tube 220. The front wheel 216a is mounted to the fork 224, as is known in the art. The head tube 222 includes a head set with bearings that allow for pivoting of the handlebar 100 about an axis 226 causing the fork 224 to pivot about the axis 226 with respect to the frame 214.

Pivoting of the fork 224 about the axis 226 causes the front wheel 216a to pivot about the axis 226. As such, pivoting of the handlebar 100 about the axis 226 allows a user of the bicycle 212 to change the travelling direction of the bicycle 212 when the bicycle 212 is moving.

With reference to FIGS. 2 to 7, the transverse support 102 includes a first wake promotion portion (WPP) 302a, a second WPP 302b, a first non-wake promotion portion (NWPP) 304, a second NWPP 306a, and a third NWPP 306b. Each WPP and NWPP is delimited in FIGS. 2 to 4 and 7 by dash-dot-dot lines representing planes that intersect the transverse support 102.

The first WPP 302a is configured to promote wake formation downstream of the first WPP 302a relative to the adjacent first NWPP 304 and the adjacent second NWPP 306a, when air flows over the handlebar 100 in a flow direction F (represented by an arrow outlined in solid line in FIGS. 1, 3, 5 and 8 to 11).

Likewise, the second WPP 302b is configured to promote wake formation downstream of the second WPP 302b relative to the adjacent first NWPP 304 and the adjacent third NWPP 306b, when air flows over the handlebar 100 in the flow direction F.

The flow direction F may be defined as substantially opposite to the direction of travel of the bicycle 212.

In FIGS. 1, 3, 5 and 6, the flow direction F is shown as being perpendicular to the transverse axis 106 and parallel to the x-axis. However, it will be appreciated that as the handlebar 100 is pivoted about the axis 226 in order to change the travelling direction of the bicycle 212, the direction of the air flowing over the handlebar 100 with respect to the transverse axis 106 will change.

A yaw angle Y is defined as the angle formed between the oncoming flow direction F and the transverse axis 106 minus ninety degrees. FIG. 3 shows the flow direction F for three yaw angles: i) a negative yaw angle Y (the left arrow outlined in dashed line in FIG. 3); ii) a zero yaw angle Y (the central arrow outlined in solid line in FIG. 3); and a positive yaw angle Y (the right arrow outlined in dashed line in FIG. 3). It is assumed that the oncoming flow direction F is substantially parallel to the x-y plane shown in the Figures.

In the following, unless otherwise stated, any reference to the flow direction F will assume that the yaw angle Y is zero; i.e. the flow direction F is perpendicular to the transverse axis 106 and parallel to the x-axis shown in the Figures.

It will be appreciated that as air flows over the handlebar 100 in the flow direction F, a boundary layer will form on the surfaces of the transverse support 102. It will also be appreciated that as the Reynolds number of the flow increases, the boundary layer may separate from one or more regions of the transverse support 102. The separated boundary layer may travel downstream of the handlebar 100 and form a downstream wake.

Each WPP 302a, 302b is configured to help ensure that the boundary layer on each WPP 302a, 302b will separate at a lower Reynolds number relative to the respective adjacent NWPPs 304, 306a, 306b. As such, each WPP 302a, 302b is configured to promote wake formation downstream thereof relative to the respective adjacent NWPPs 304, 306a, 306b.

For a critical Reynolds number of the flow travelling along flow direction F, the boundary layer on each NWPP 304, 306a, 306b may separate and form a downstream wake. However, for a given Reynolds number, the size of the wakes formed by the NWPPs 304, 306a, 306b may be smaller than the size of the wakes formed by the WPPs 302a, 302b.

It will be appreciated that promoting boundary layer separation and thus downstream wake formation via the WPPs 302a, 302b will result in an increase in form drag acting on the handlebar 100 relative to if the WPPs 302a, 302b were not present. However, in use, when the bicycle 212 and the operator (i.e. rider) of the bicycle 212 are also taken into consideration, it has been determined that the WPPs 302a, 302b result in a reduction of the combined total drag relative to if the WPPs 302a, 302b were not present. The combined total drag is defined as the resultant of the drag forces acting on: i) the handlebar; ii) the remainder of the bicycle 212; and iii) the operator of the bicycle 212.

Figure 11:
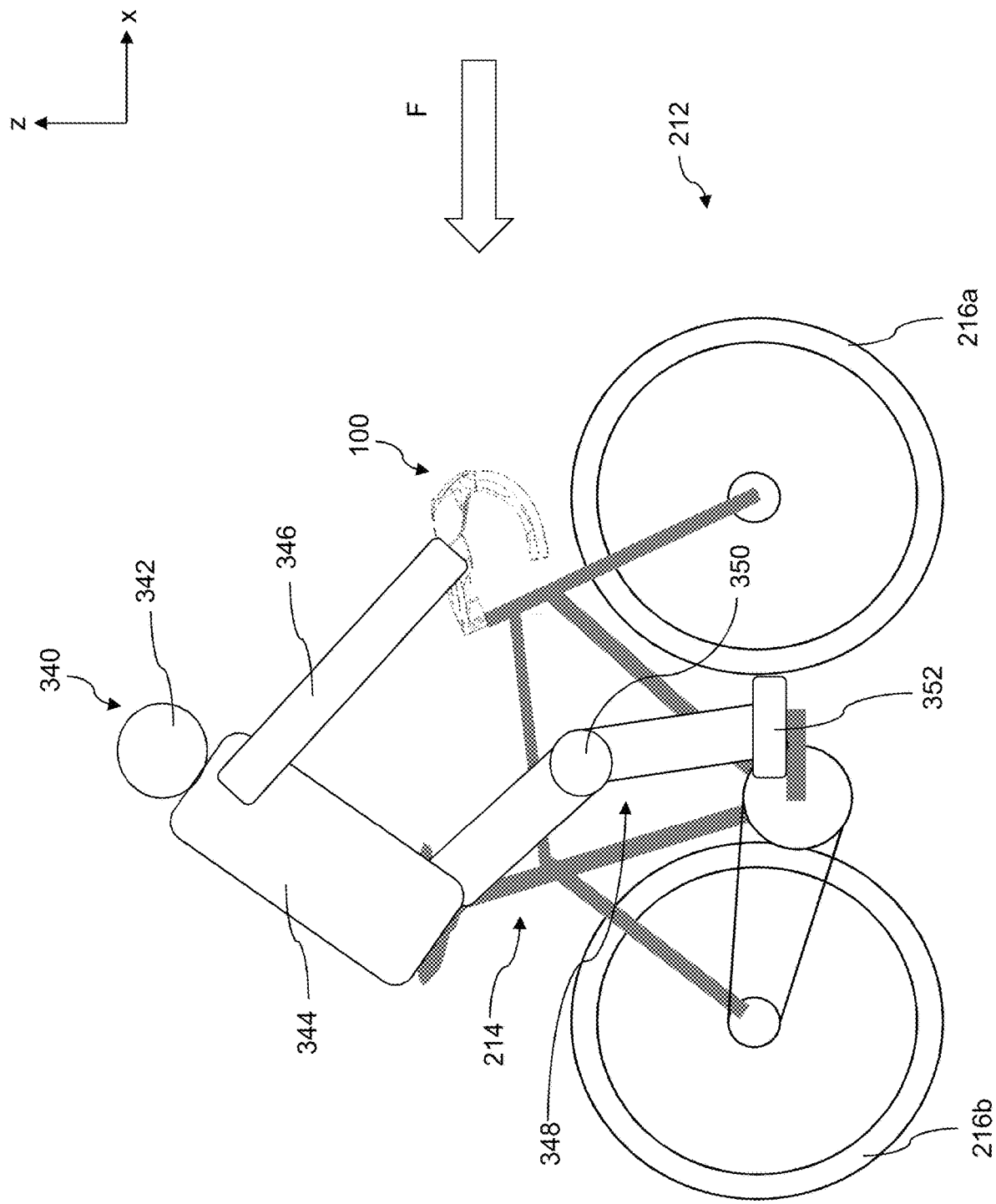
FIG. 11 is a side view of the bicycle of FIG. 1 and a bicycle operator.

FIG. 11 shows the bicycle 212 of FIG. 1 and a schematic representation of a bicycle operator 340. FIG. 11 shows the head 342, torso 344, right arm 346, right leg 348 and right foot 352 of the operator 340. The right leg 348 includes a right knee 350.

With reference to FIG. 11, as air flows over the handlebar 100 along flow direction F, the WPPs 302a, 302b are configured such that the wakes formed downstream of the WPPs 302a, 302b are directed generally towards the operator 340. It is thought that downstream wakes directed towards the operator 340 may help to reduce the overall form drag of the operator 340 and the bicycle 212, leading to a reduction in combined total drag.

For example, it has been found that significant reductions in combined total drag can be achieved by configuring the WPPs 302a, 302b to direct the formed downstream wakes generally towards the legs 348 of the operator 340.

It has been found that the inclusion of the WPPs 302a, 302b on the handlebar 100 provide significant reductions in combined total drag across a range of yaw angles Y of −20 degrees to +20 degrees.

The first WPP 302a is interposed between the transverse central plane P and the first end 109a of the transverse support 102. The second WPP 302b is interposed between the transverse central plane P and the second end 109b of the transverse support 102.

Positioning the WPPs 302a, 302b as such may help to ensure that wakes formed downstream of the WPPs 302a, 302b are directed towards the legs 348 of the bicycle operator 340.

The first NWPP 304 is interposed between the first WPP 302a and the second WPP 302b. In the illustrated embodiment, the first NWPP 304 is intersected by the transverse central plane P.

The position of the first NWPP 304 may help to reduce the magnitude of wakes downstream of the transverse mid-point of the transverse support 102. Advantageously, this may help to reduce the combined total drag as well as increasing the comfort of the bicycle operator 340, since large downstream wakes are less likely to be directed towards the head 342 or torso 344 of the operator 340.

In the illustrated embodiment, the first NWPP 304 includes all of the mounting portion 108 except for the mounting arrangement; i.e. the clamp 111. The wake promotion properties of the mounting arrangement will be dependent on the components of the bicycle 212 to which it is mounted.

The second NWPP 306a is interposed between the first WPP 302a and the first end 109a of the transverse support 102. The third NWPP 306b is interposed between the second WPP 302b and the second end 109b of the transverse support 102.

Wakes formed downstream of the regions of the transverse support 102 proximate the first and second ends 109a, 109b are less likely to be directed towards the bicycle operator 340 (e.g. the legs 348 of the bicycle operator 340), and therefore are less likely to contribute to the combined total drag reduction. Hence, to help limit the form drag of the handlebar 100, the regions of the transverse support 102 proximate the first and second ends 109a, 109b are provided as NWPPs 306a, 306b.

With reference to FIGS. 2 and 3, the handlebar 100 is symmetric about the transverse center plane P. As such, the first WPP 302a is a mirror image of the second WPP 302b, the second NWPP 306a is a mirror image of the third NWPP 306b, and the first grippable element 104a is a mirror image of the second grippable element 104b, about the transverse center plane P. Hence, in the following, anything discussed in relation to the first WPP 302a will apply mutatis mutandis to the second WPP 302b, anything discussed in relation to the second NWPP 306a will apply mutatis mutandis to the third NWPP 306b, and anything discussed in relation to the first grippable element 104a will apply mutatis mutandis to the second grippable element 104b, unless otherwise stated.

Figure 7:
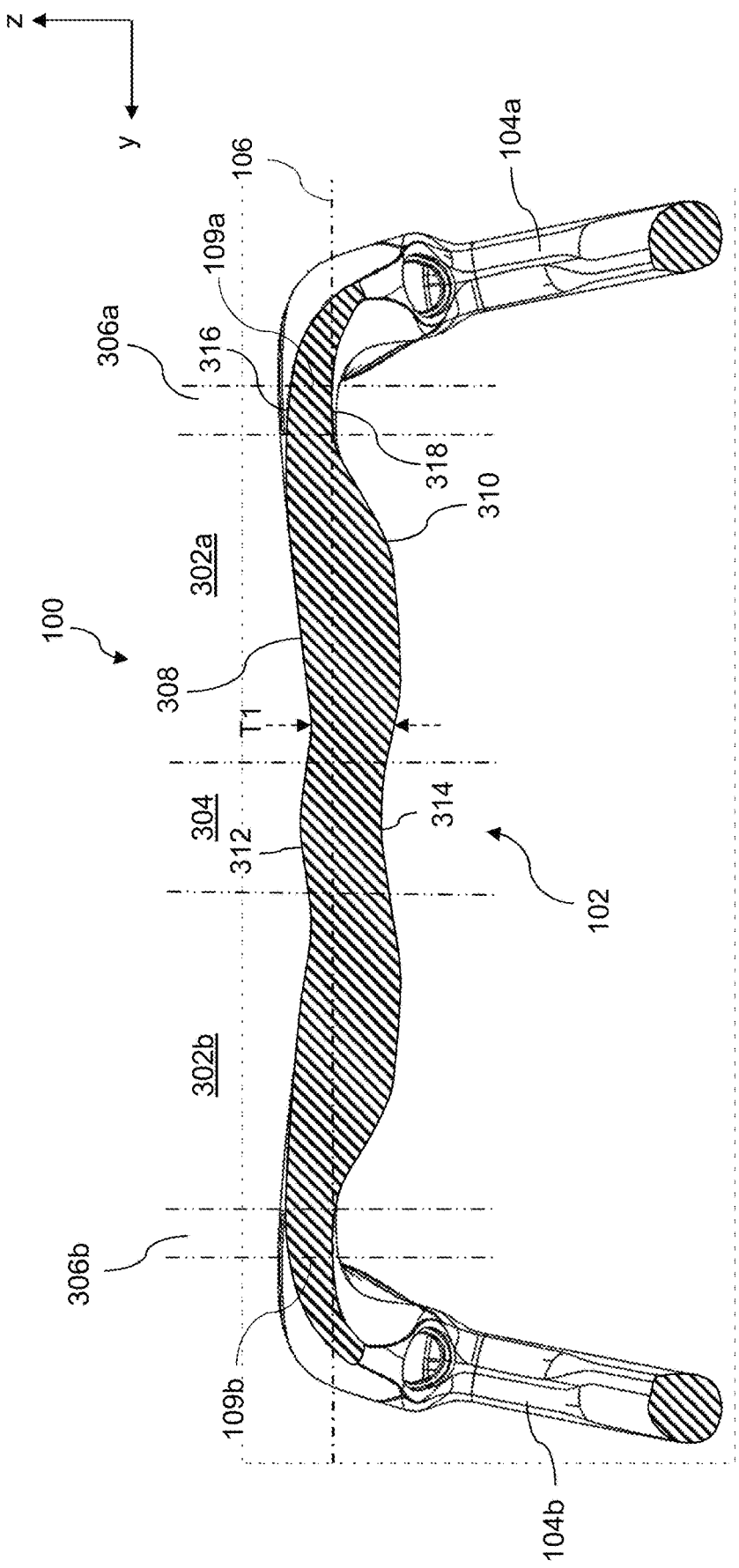
FIG. 7 is a rear cross-sectional view of the handlebar shown in FIG. 2.

FIG. 7 shows a cross-sectional view of the handlebar 100 along the section line VII-VII shown in FIG. 3. As such, FIG. 7 shows a cross-sectional profile of the handlebar 100 in a plane which is normal to the flow direction F; i.e. parallel to the y-z plane in the Figures.

With reference to FIG. 7, the first WPP 302a is partially defined by a first surface 308 and an opposed second surface 310. The first and second surfaces 308, 310 extend along the transverse length of the first WPP 302a; i.e. from the boundary between the first WPP 302a and the first NWPP 304 to the boundary between the first WPP 302a and the second NWPP 306a. By comparing FIGS. 1 and 7, it will be appreciated that when the handlebar 100 is in use, i.e. mounted to the bicycle 212, the first surface 308 is arranged above the second surface 310.

It can be seen in FIG. 7 that the profile of the first surface 308 is non-parallel to the profile of the second surface 310. In particular, in the illustrated embodiment, the second surface 310 has a hump-shaped or bulge-shaped profile in FIG. 7. Whereas, the first surface 308 has a less curved profile, i.e. a profile with a smaller maximum and/or average curvature, relative to the second surface 310. Relative to the profile of the second surface 310, the profile of the first surface 308 has a larger portion which is substantially straight or flat. It can be seen from FIG. 7 that a majority of the profile of the first surface 308 is substantially straight or flat.

Providing the lower second surface 310 with a hump-shaped profile may help to ensure wakes are formed upstream of a leg 348 of the bicycle operator 348.

In alternative embodiments (not shown), the whole of the profile of the first surface 308 may be substantially straight.

In alternative embodiments (not shown), the first surface 308 may have a hump-shaped or bulge-shaped profile and the second surface 310 may have a less curved profile, i.e. a profile with a smaller maximum and/or average curvature, relative to the first surface 308. For example, the profile of the second surface 310 may be substantially straight.

As shown in FIG. 7, the first WPP 302a has a variable thickness T1, which varies along the transverse length of the first WPP 302a. The variable thickness T1 is the variable distance between the first surface 308 and the second surface 310 and is measured perpendicular to the flow direction F and perpendicular to the transverse axis 106; i.e. along the z-axis shown in the Figures.

Figure 8:
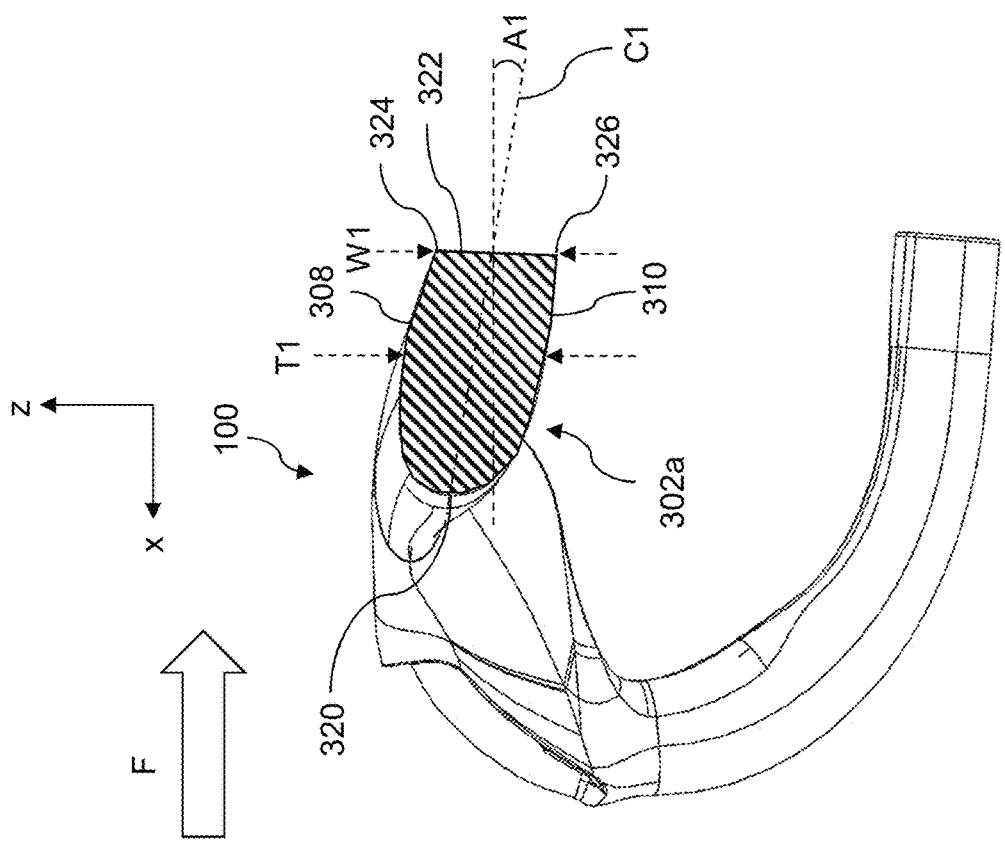
FIG. 8 is a side cross-sectional view of a wake promotion portion of the handlebar shown in FIG. 2.

It can be seen in FIG. 8 that the variable thickness T1 of the first WPP 302a also varies along the flow direction F; i.e. along the x-axis shown in the Figures.

In the illustrated embodiment, the variable thickness T1 of the first WPP 302a tapers along the transverse axis 106 towards the first end 109a of the transverse support 102. Moreover, the variable thickness T1 of the first WPP 302a tapers along the transverse axis 106 towards the second end 109b of the transverse support 102.

Advantageously, tapering the thickness of the first WPP 302a towards the first end 109a and the second end 109b, helps to direct downstream wakes formed by the first WPP 302a towards the bicycle operator 340; for example, towards the leg 348 of the bicycle operator 340.

In alternative embodiments (not shown), the variable thickness T1 of the first WPP 302a may only taper towards the first end 109a or the second end 109b of the transverse support 102.

With continued reference to FIG. 7, the first NWPP 304 is partially defined by a first surface 312 and an opposed second surface 314. The first and second surfaces 312, 314 extend along the transverse length of the first NWPP 304; i.e. from the boundary between the first NWPP 304 and the first WPP 302a to the boundary between the first NWPP 304 and the second WPP 302b. By comparing FIGS. 1 and 7, it will be appreciated that when the handlebar 100 is in use, i.e. mounted to the bicycle 212, the first surface 312 is arranged above the second surface 314.

It can be seen in FIG. 7 that the profile of the first surface 312 of the first NWPP 304 is substantially parallel to the profile of the second surface 314 of the first NWPP 304. In particular, in the illustrated embodiment, the first and second surfaces 312, 314 have substantially parallel curved profiles.

With continued reference to FIG. 7, the second NWPP 306a is partially defined by a first surface 316 and an opposed second surface 318. The first and second surfaces 316, 318 extend along the transverse length of the second NWPP 306a; i.e. from the boundary between the second NWPP 306a and the first WPP 302a to the first end 109a. By comparing FIGS. 1 and 7, it will be appreciated that when the handlebar 100 is in use, i.e. mounted to the bicycle 212, the first surface 316 is arranged above the second surface 318.

It can be seen in FIG. 7 that the profile of the first surface 316 of the second NWPP 306a is substantially parallel to the profile of the second surface 318 of the second NWPP 306a. In particular, in the illustrated embodiment, the first and second surfaces 316, 318 have substantially parallel and substantially straight profiles.

Figure 6:
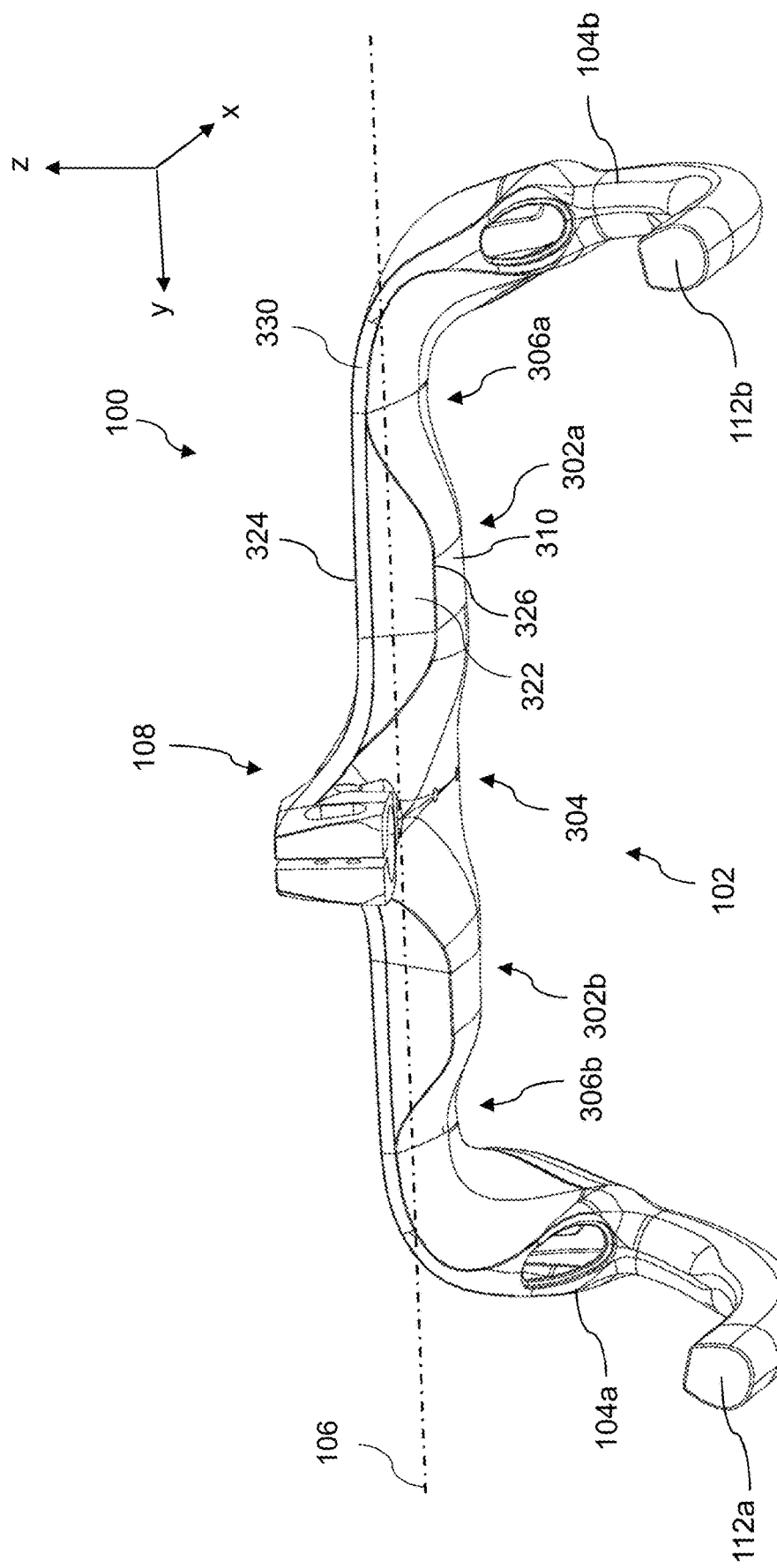
FIG. 6 is an isometric view of the handlebar shown in FIG. 2.

FIGS. 2, 6 and 7 show that the profile of the transverse support 102 varies smoothly (i.e. continuously and without discontinuity) along the transverse axis 106. Advantageously, this helps to reduce drag acting on the handlebar 100 resulting from air flowing over the handlebar 100 parallel to the transverse axis 106.

Figure 4:
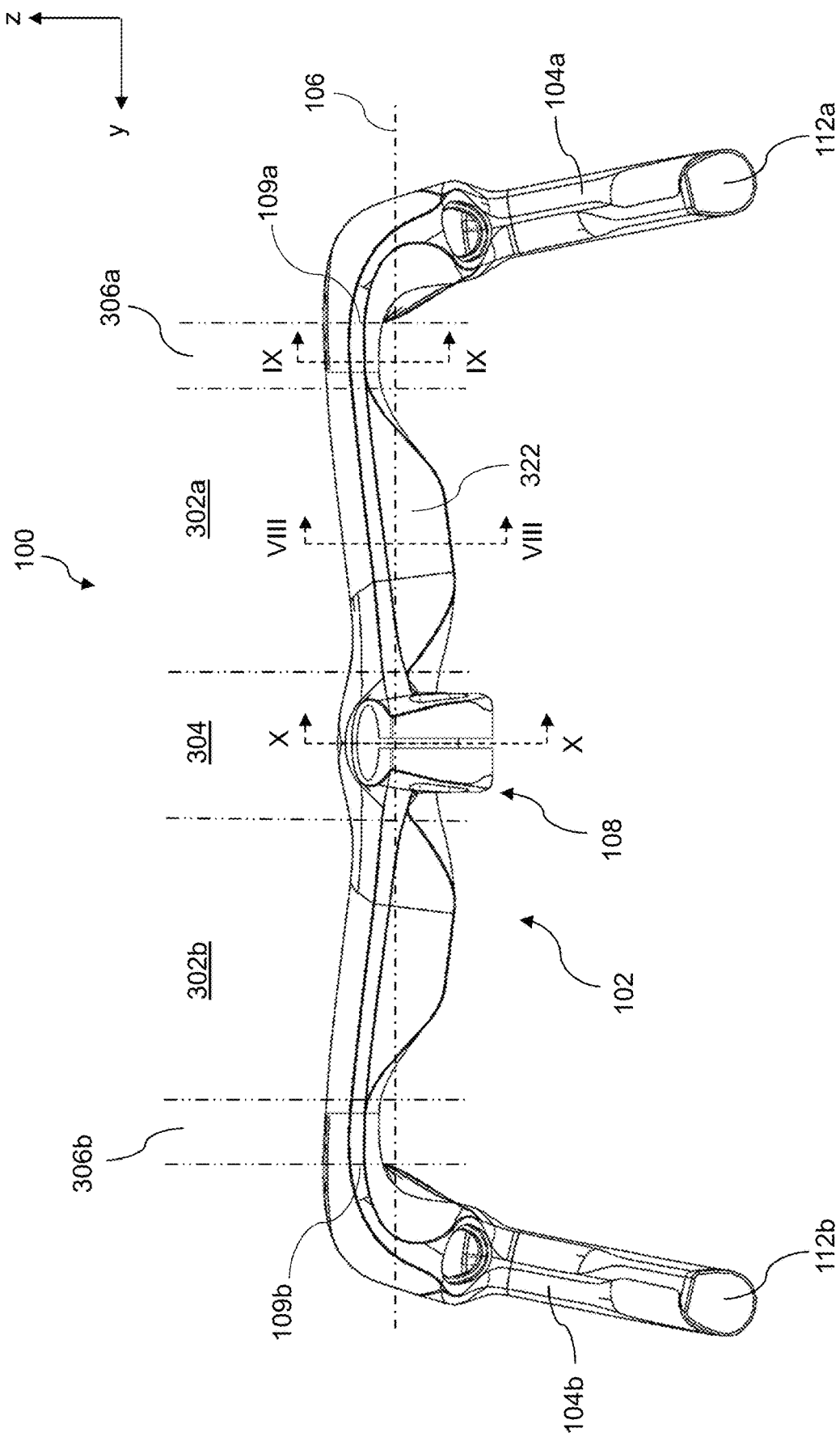
FIG. 4 is a rear view of the handlebar shown in FIG. 2.

FIG. 8 shows a cross-sectional view of the handlebar 100 along the section line VIII-VIII shown in FIG. 4. As such, FIG. 8 shows a cross-sectional profile of the first WPP 302a of the handlebar 100 in a plane which is parallel to the flow direction F and normal to the transverse axis 106; i.e. in the x-z plane shown in the Figures.

Figure 5:
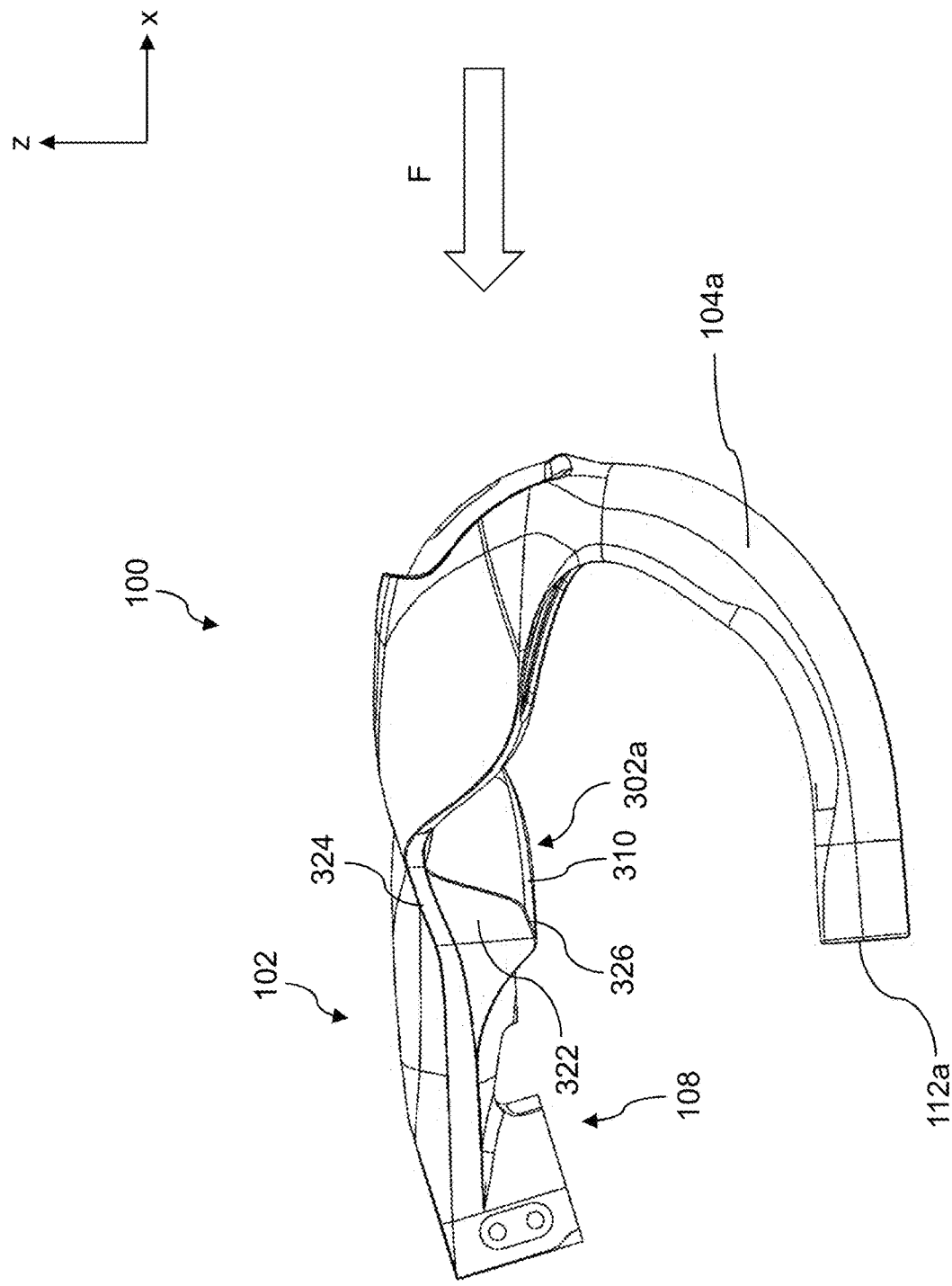
FIG. 5 is a side view of the handlebar shown in FIG. 2.

With reference to FIGS. 5, 6 and 8, the first WPP 302a has a non-circular profile. In particular, the first WPP 302a has a substantially aerofoil-shaped profile with a truncated trailing edge, said profile including a rounded leading edge 320, the upper surface 308, the lower surface 310 and a first downstream wall 322. The first downstream wall 322 is joined to the remainder of the profile via a first corner 324 and a second corner 326.

In the illustrated embodiment, the first downstream wall 322 is substantially planar. In alternative embodiments (not shown), the first downstream wall 322 may instead have any suitable non-planar shape.

In the illustrated embodiment, the first corner 324 and the second corner 326 are angular; i.e. they are "sharp" corners. It will be appreciated that providing the corners 324, 326 as sharp corners will help to enhance boundary layer separation downstream of the first WPP 302a relative to if the corners 324, 326 were rounded. In alternative embodiments (not shown), the first corner 324 and/or the second corner 326 may instead be rounded.

The first downstream wall 322 has a variable width W1 which varies along the transverse axis 106. The variable width W1 is measured perpendicular to the flow direction F and perpendicular to the transverse axis 106; i.e. parallel to the z-axis shown in the Figures.

FIG. 8 shows a chord line C1 (represented as a dash-dot line in FIG. 8) for the aerofoil-shaped profile of the first WPP 302a. In the illustrated embodiment, the chord line C1 is a straight line that passes through the leading edge 320 and a mid-point of the first downstream wall 322 (i.e. a mid-point along the z-axis, which is perpendicular to both the flow direction F and the transverse axis 106).

In alternative embodiments (not shown), the first WPP 302a may have an aerofoil-shaped profile without a truncated trailing edge. In such embodiments, the chord line C1 may intersect the leading edge and a trailing edge of the profile, as is well known in the art.

The chord line C1 has an angle of attack A1. The angle of attack A1 is defined as the angle formed between the chord line C1 and an axis which is parallel to the flow direction F; i.e. an axis which is parallel to the x-axis shown in the Figures.

Figure 9:
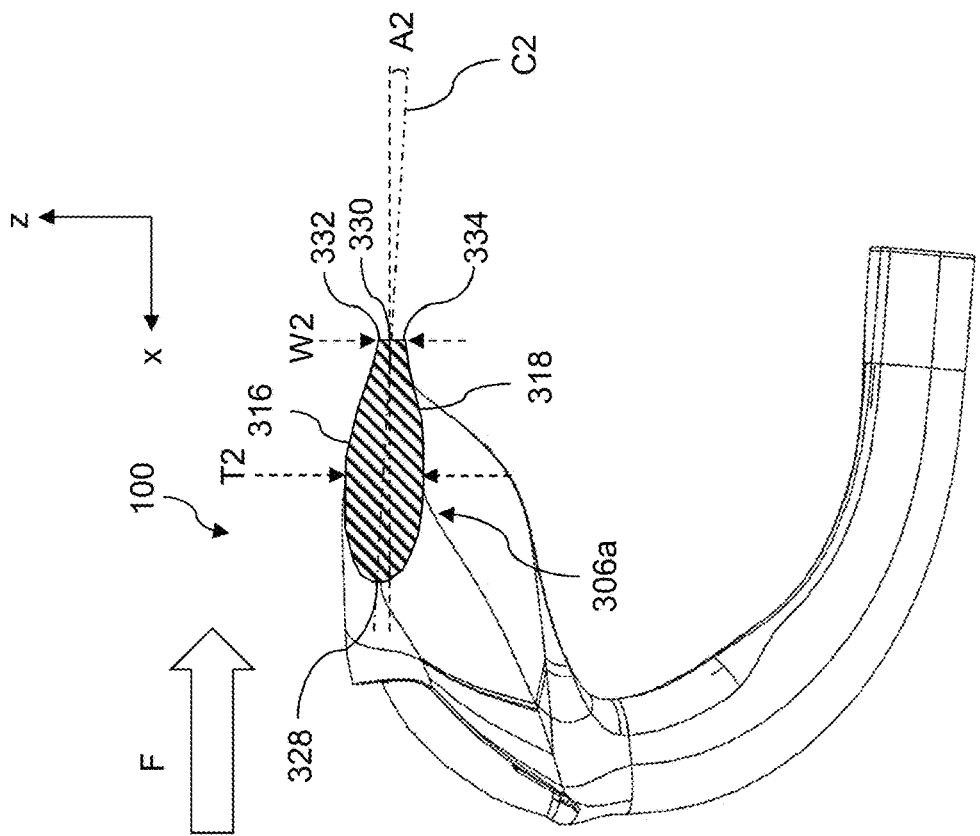
FIG. 9 is a side cross-sectional view of a non-wake promotion portion of the handlebar shown in FIG. 2.

FIG. 9 shows a cross-sectional view of the handlebar 100 along the section line IX-IX in FIG. 4. As such, FIG. 9 shows a cross-sectional profile of the second NWPP 306a of the handlebar 100 in a plane which is parallel to the flow direction F and normal to the transverse axis 106; i.e. in the x-z plane shown in the Figures.

With reference to FIGS. 6 and 9, the second NWPP 306a has a non-circular profile. In particular, the second NWPP 306a has a substantially aerofoil-shaped profile with a truncated trailing edge, said profile including a rounded leading edge 328, the upper first surface 316, the second surface 318 and a second downstream wall 330. The second downstream wall 330 is joined to the remainder of the profile via a first corner 332 and a second corner 334.

In the illustrated embodiment, the second downstream wall 330 is substantially planar. In alternative embodiments (not shown), the second downstream wall 330 may instead have any suitable non-planar shape.

In the illustrated embodiment the first corner 332 and the second corner 334 are angled corners. However, in alternative embodiments (not shown), the first corner 332 and/or the second corner 334 may be rounded corners.

The second downstream wall 330 has a variable width W2, which varies along the transverse axis 106. The variable width W2 is measured perpendicular to the flow direction F and perpendicular to the transverse axis 106.

From FIGS. 4, 6, 8 and 9, it is clear that the maximum width of the first downstream wall 322, i.e. the maximum of variable W1, is greater than the maximum width of the second downstream wall 330, i.e. the maximum of variable W2. Advantageously, this may help to increase the size of wakes formed downstream of the first WPP 302a relative to the second NWPP 306a. In turn, this may help to reduce the combined total drag.

The second NWPP 306a has a variable thickness T2, which varies predominantly along the flow direction F (i.e. x-axis), and to a lesser extent along the transverse length of the second NWPP 306a. The variable thickness T2 is the variable distance between the first surface 316 and the second surface 318 and is measured perpendicular to the flow direction F and perpendicular to the transverse axis 106; i.e. parallel to the z-axis.

FIG. 9 shows a chord line C2 (represented as a dash-dot line in FIG. 9) for the aerofoil-shaped profile of the second NWPP 306a. In the illustrated embodiment, the chord line C2 is a straight line that passes through the leading edge 328 and a mid-point of the second downstream wall 330 (i.e. a mid-point along the z-axis, which is perpendicular to both the flow direction F and the transverse axis 106).

In alternative embodiments (not shown), the second NWPP 306a may have an aerofoil-shaped profile without a truncated trailing edge. In such embodiments, the chord line C2 may intersect the leading edge and a trailing edge of the profile, as is well known in the art.

The chord line C2 has an angle of attack A2. The angle of attack A2 is defined as the angle formed between the chord line C2 and an axis which is parallel to the flow direction F; i.e. parallel to the x-axis.

Figure 10:
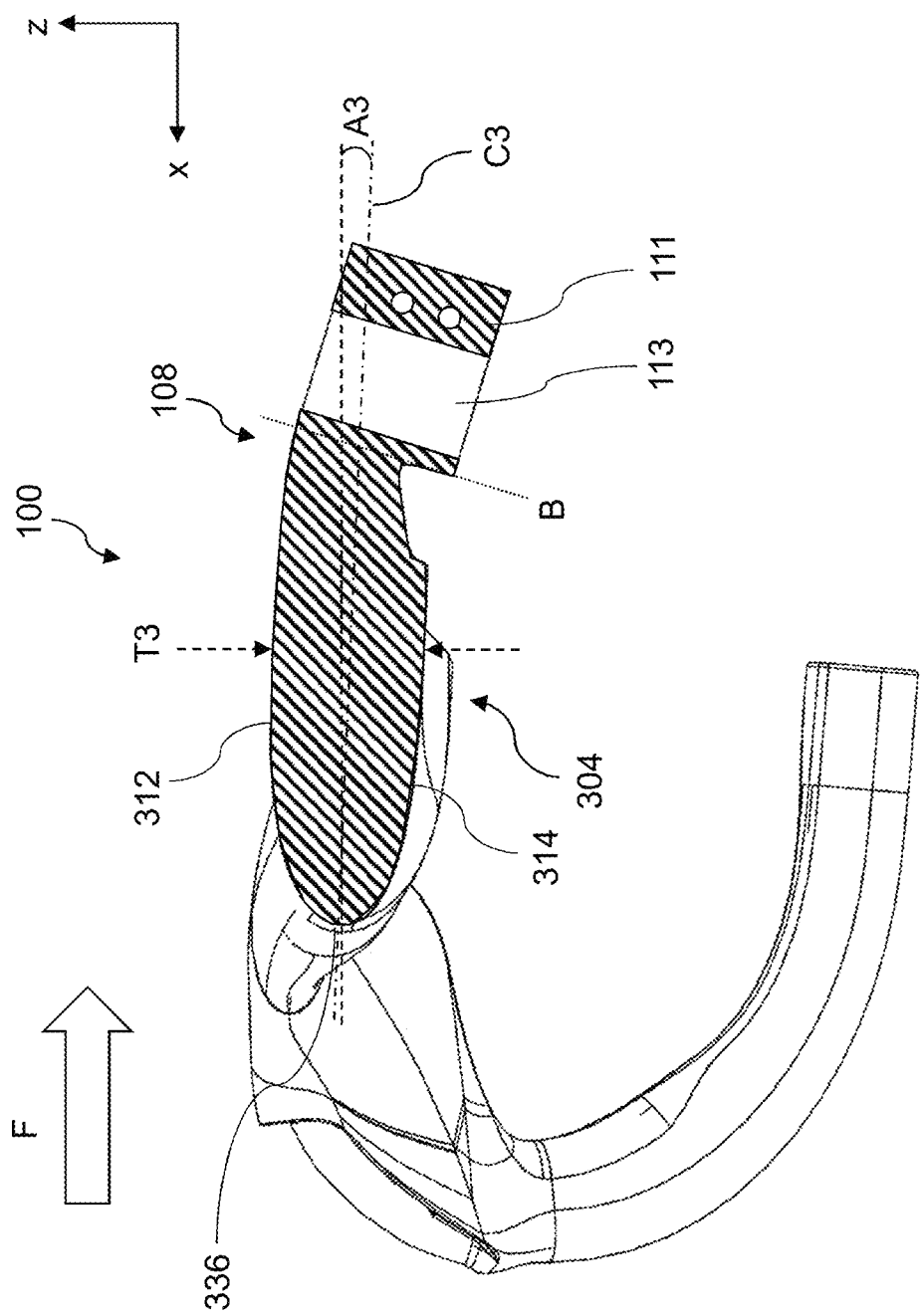
FIG. 10 is a side cross-sectional view of a mounting portion of the handlebar shown in FIG. 2.

FIG. 10 shows a cross-sectional view of the handlebar 100 along the section line X-X in FIG. 4. As such, FIG. 10 shows a cross-sectional profile of the first NWPP 304 and the mounting portion 108 of the handlebar 100 in a plane which is parallel to the flow direction F and normal to the transverse axis 106.

With reference to FIG. 10, the first NWPP 304 has a non-circular profile. In particular, the second NWPP 306a has a substantially aerofoil-shaped profile with a truncated trailing edge, said profile including a rounded leading edge 336, the first surface 312, the second surface 314 and a boundary B (represented as a dotted line in FIG. 10) between the first NWPP 304 and the clamp 111.

The first NWPP 304 has a variable thickness T3, which varies along the flow direction F, and along the transverse length of the first NWPP 304. The variable thickness T3 is the variable distance between the first surface 312 and the second surface 314 and is measured perpendicular to the flow direction F and perpendicular to the transverse axis 106; i.e. parallel to the z-axis.

FIG. 10 shows a chord line C3 (represented as a dash-dot line in FIG. 10) for the aerofoil-shaped profile of the first NWPP 304. In the illustrated embodiment, the chord line C3 is a straight line that passes through the leading edge 336 and a mid-point of the 30 boundary B (i.e. a mid-point along the boundary B in a direction which is perpendicular to the transverse axis 106).

In alternative embodiments (not shown), the first NWPP 304 may have an aerofoil-shaped profile without a truncated trailing edge. In such embodiments, the mounting portion may not include the clamp 111, and the chord line C3 may intersect the leading edge and a trailing edge of the profile, as is well known in the art.

With reference to FIGS. 8, 9 and 10, the first WPP 302a has a maximum thickness, i.e. the maximum of variable thickness T1, which is greater than a maximum thickness of the first NWPP 304, i.e. the maximum of variable thickness T3. Moreover, the first WPP 302a has a maximum thickness, which is greater than a maximum thickness of the second NWPP 306a, i.e. the maximum of variable thickness T2.

Providing the first WPP 302a with a greater maximum thickness relative to the NWPPs 304, 306a, may result in the flow over the first WPP 302a having an adverse pressure gradient of a greater magnitude relative to the NWPPs 304, 306a. As such, boundary layer separation, and thus downstream wake formation, is promoted on the first WPP 302a to a greater degree relative to the NWPPs 304, 306a.

With reference to FIGS. 8, 9 and 10, the angle of attack A1 of the profile aof the first WPP 302a is greater than the angle of attack A3 of the profile of the first NWPP 304; i.e. A1>A3. Moreover, the angle of attack A1 of the profile of the first WPP 302a is greater than the angle of attack A2 of the profile of the second NWPP 306a; i.e. A1>A2.

It will be appreciated that for a given flow Reynolds number, increasing the angle of attack of an aerofoil will make the boundary layer over the aerofoil more susceptible to separation; i.e. to stall. Hence, providing the first WPP 302a with a greater angle of attack relative to the NWPPs 304, 306a, may result in boundary layer separation at a lower flow Reynolds number relative to the NWPPs 304, 306a. Thus downstream wake formation is 20 promoted on the first WPP 302a to a greater degree relative to the NWPPs 304, 306a.

In the foregoing disclosure, the transverse support 102 includes two WPPs 302*a*, 302*b* and three NWPPs 304, 306*a*, 306*b*. In alternative embodiments (not shown), the transverse support 102 may include one, three or more than three WPPs. In such embodiments, the transverse support 102 may include one, two, four or more than four NWPPs.

For example, the transverse support 102 may include one WPP that extends transversely (i.e. parallel to the transverse axis 106) from a first portion end to a second portion end, where the first portion end is located between the first end 109*a* of the transverse support 102 and the transverse central plane P, and the second portion end is located between the second end 109*b* of the transverse support 102 and the transverse central plane P. Said WPP extends across the transverse central plane P. Said WPP may share any of the same characteristics as the first WPP 302*a*.

In the foregoing disclosure, the transverse support 102 has a substantially aerofoil shaped profile. In alternative embodiments (not shown), one or both of the WPPs 302*a*, 302*b* and/or one or more of the NWPPs 304, 306*a*, 306*b* may instead have non-aerofoil shaped profiles; for example other suitable non-circular profiles or circular profiles.

In alternative embodiments (not shown), the WPPs 302*a*, 302*b* and/or the NWPPs 304, 306*a*, 306*b* may instead have circular profiles. For example, the WPPs 302*a*, 302*b* and the NWPPs 304, 306*a*, 306*b* may have circular profiles, where the circular profiles of the WPPs 302*a*, 302*b* have a larger radius relative to the circular profiles of the NWPPs 304, 306*a*, 306*b*.

What is claimed is:

1. A handlebar for controlling a travelling direction of a vehicle, the handlebar comprising:
    an elongate transverse support for mounting to a vehicle, the transverse support extending along a transverse axis between a first end thereof and a second end thereof;
    wherein the transverse support comprises a first wake promotion portion configured to promote wake formation downstream thereof relative to one or more adjacent non-wake promotion portions of the transverse support when air flows over the handlebar in a flow direction substantially perpendicular to the transverse axis, wherein the first wake promotion portion has a substantially aerofoil-shaped profile with a truncated trailing edge defining a first downstream wall, the first downstream wall joined to a remainder of the profile via a first corner and a second corner.

2. The handlebar of claim 1, wherein the first wake promotion portion is interposed between a transverse mid-point of the transverse support and the first end.

3. The handlebar of claim 2, further comprising a second wake promotion portion configured to promote wake formation downstream thereof relative to one or more adjacent non-wake promotion portions of the transverse support when air flows over the handlebar in the flow direction.

4. The handlebar of claim 2, wherein one of the one or more non-wake promotion portions is interposed between the first wake promotion portion and the first end.

5. The handlebar of claim 4, further comprising a second wake promotion portion configured to promote wake formation downstream thereof relative to one or more adjacent non-wake promotion portions of the transverse support when air flows over the handlebar in the flow direction.

6. The handlebar of claim 1, further comprising a second wake promotion portion configured to promote wake formation downstream thereof relative to one or more adjacent non-wake promotion portions of the transverse support when air flows over the handlebar in the flow direction.

7. The handlebar of claim 6, wherein the second wake promotion portion is interposed between the transverse mid-point of the transverse support and the second end of the transverse support.

8. The handlebar of claim 7, wherein one of the one or more non-wake promotion portions is interposed between the second wake promotion portion and the second end.

9. The handlebar of claim 6, wherein one of the one or more non-wake promotion portions is interposed between the first wake promotion portion and the second wake promotion portion.

10. The handlebar of claim 9, wherein the one of the one or more non-wake promotion portions is located at a transverse mid-point of the transverse support.

11. The handlebar of claim 1, wherein the first wake promotion portion extends transversely from a first portion end to a second portion end, the first portion end located between the first end and a transverse mid-point of the transverse support, the second portion end located between the second end and the transverse mid-point of the transverse support.

12. The handlebar of claim 1, wherein the first wake promotion portion is at least partially defined by a first surface and an opposed second surface, the first and second surfaces extending along a transverse length of the wake promotion portion, wherein a profile of the first surface in a plane normal to the flow direction is non-parallel to a corresponding profile of the second surface.

13. The handlebar of claim 1, wherein the first wake promotion portion is at least partially defined by a first surface and an opposed second surface, the first and second surfaces extending along a transverse length of the wake promotion portion, wherein the first surface or the second surface has a hump-shaped profile in a plane normal to the flow direction.

14. The handlebar of claim 13 wherein the other of the first surface or the second surface has a relatively less curved profile in a plane normal to the flow direction.

15. The handlebar of claim 1, wherein at least one of the one or more non-wake promotion portions is at least partially defined by a first surface and an opposed second surface, the first and second surfaces extending along a transverse length of the non-wake promotion portion, wherein a profile of the first surface in a plane normal to the flow direction is substantially parallel to a corresponding profile of the second surface.

16. The handlebar of claim 1, wherein the first wake promotion portion has a maximum thickness substantially normal to the flow direction greater than a corresponding maximum thickness of the one or more non-wake promotion portions.

17. The handlebar of claim 1 wherein at least one of the first corner and the second corner is angular.

18. The handlebar of claim 1, wherein at least one of the one or more non-wake promotion portions has a substantially aerofoil-shaped profile with a truncated trailing edge defining a second downstream wall, and wherein the first downstream wall has a maximum width perpendicular to the flow direction greater than a corresponding maximum width of each second downstream wall.

19. The handlebar of claim 1 in combination with a bicycle.

20. A handlebar for controlling a travelling direction of a vehicle, the handlebar comprising:
    an elongate transverse support for mounting to a vehicle, the transverse support extending along a transverse axis between a first end thereof and a second end thereof;

wherein the transverse support comprises a first wake promotion portion configured to promote wake formation downstream thereof relative to one or more adjacent non-wake promotion portions of the transverse support when air flows over the handlebar in a flow direction substantially perpendicular to the transverse axis, wherein the first wake promotion portion has a substantially aerofoil-shaped profile and at least one of the one or more non-wake promotion portions has an aerofoil-shaped profile, and wherein the substantially aerofoil-shaped profile of the first wake promotion portion has a greater angle of attack with respect to the flow direction relative to the aerofoil-shaped profile of the at least one of the one or more non-wake promotion portions.

21. The handlebar of claim 20, wherein the first wake promotion portion is interposed between a transverse midpoint of the transverse support and the first end.

22. The handlebar of claim 20, further comprising a second wake promotion portion configured to promote wake formation downstream thereof relative to one or more adjacent non-wake promotion portions of the transverse support when air flows over the handlebar in the flow direction.

23. The handlebar of claim 20, wherein the first wake promotion portion is at least partially defined by a first surface and an opposed second surface, the first and second surfaces extending along a transverse length of the wake promotion portion, wherein a profile of the first surface in a plane normal to the flow direction is non-parallel to a corresponding profile of the second surface.

24. The handlebar of claim 20, wherein the first wake promotion portion is at least partially defined by a first surface and an opposed second surface, the first and second surfaces extending along a transverse length of the wake promotion portion, wherein the first surface or the second surface has a hump-shaped profile in a plane normal to the flow direction.

25. The handlebar of claim 24 wherein the other of the first surface or the second surface has a relatively less curved profile in a plane normal to the flow direction.

26. The handlebar of claim 20, wherein at least one of the one or more non-wake promotion portions is at least partially defined by a first surface and an opposed second surface, the first and second surfaces extending along a transverse length of the non-wake promotion portion, wherein a profile of the first surface in a plane normal to the flow direction is substantially parallel to a corresponding profile of the second surface.

27. The handlebar of claim 20, wherein the first wake promotion portion has a maximum thickness substantially normal to the flow direction greater than a corresponding maximum thickness of the one or more non-wake promotion portions.

28. A handlebar for controlling a travelling direction of a vehicle, the handlebar comprising:
an elongate transverse support for mounting to a vehicle, the transverse support extending along a transverse axis between a first end thereof and a second end thereof;
wherein the transverse support comprises a first wake promotion portion configured to promote wake formation downstream thereof relative to one or more adjacent non-wake promotion portions of the transverse support when air flows over the handlebar in a flow direction substantially perpendicular to the transverse axis, wherein a variable thickness of the first wake promotion portion substantially normal to the flow direction tapers towards at least one of the first end and the second end of the transverse support.

29. The handlebar of claim 28, wherein the first wake promotion portion is interposed between a transverse midpoint of the transverse support and the first end.

30. The handlebar of claim 28, further comprising a second wake promotion portion configured to promote wake formation downstream thereof relative to one or more adjacent non-wake promotion portions of the transverse support when air flows over the handlebar in the flow direction.

31. The handlebar of claim 28, wherein the first wake promotion portion is at least partially defined by a first surface and an opposed second surface, the first and second surfaces extending along a transverse length of the wake promotion portion, wherein a profile of the first surface in a plane normal to the flow direction is non-parallel to a corresponding profile of the second surface.

32. The handlebar of claim 28, wherein the first wake promotion portion is at least partially defined by a first surface and an opposed second surface, the first and second surfaces extending along a transverse length of the wake promotion portion, wherein the first surface or the second surface has a hump-shaped profile in a plane normal to the flow direction.

33. The handlebar of claim 32 wherein the other of the first surface or the second surface has a relatively less curved profile in a plane normal to the flow direction.

34. The handlebar of claim 28, wherein at least one of the one or more non-wake promotion portions is at least partially defined by a first surface and an opposed second surface, the first and second surfaces extending along a transverse length of the non-wake promotion portion, wherein a profile of the first surface in a plane normal to the flow direction is substantially parallel to a corresponding profile of the second surface.

35. The handlebar of claim 28, wherein the first wake promotion portion has a maximum thickness substantially normal to the flow direction greater than a corresponding maximum thickness of the one or more non-wake promotion portions.

* * * * *